(12) United States Patent
Salib

(10) Patent No.: US 7,310,182 B2
(45) Date of Patent: Dec. 18, 2007

(54) METHOD AND APPARATUS FOR MODULATING AN OPTICAL BEAM IN AN OPTICAL DEVICE WITH A PHOTONIC CRYSTAL LATTICE

(75) Inventor: Michael S. Salib, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 608 days.

(21) Appl. No.: 10/783,525

(22) Filed: Feb. 20, 2004

(65) Prior Publication Data

US 2005/0185966 A1    Aug. 25, 2005

(51) Int. Cl.
*G02F 1/00* (2006.01)
*G02B 6/10* (2006.01)

(52) U.S. Cl. .................. 359/321; 359/322; 385/129

(58) Field of Classification Search ................ 359/245, 359/298, 315, 320, 321, 322; 257/98; 385/129, 385/130, 131, 132
See application file for complete search history.

(56) References Cited

U.S. PATENT DOCUMENTS

| | | | |
|---|---|---|---|
| 6,466,360 B2 * | 10/2002 | Tokushima | ................. 359/321 |
| 6,891,985 B2 * | 5/2005 | Delwala | ...................... 385/14 |
| 6,912,334 B2 * | 6/2005 | Koyama | ...................... 385/16 |
| 6,990,257 B2 * | 1/2006 | Gunn et al. | ..................... 385/2 |
| 2002/0021878 A1 | 2/2002 | Allan et al. | |
| 2003/0185532 A1 | 10/2003 | Hosomi et al. | |
| 2004/0213534 A9 * | 10/2004 | Matsuura et al. | ........... 385/129 |

FOREIGN PATENT DOCUMENTS

WO    WO 03/062882 A2    7/2003

WO    WO 03/098331 A1    11/2003

(Continued)

OTHER PUBLICATIONS

Arentoft, J. et al., "Realization of Robust Photonic Crystal Waveguides Designed to Reduce Out-Of-Plane Scattering," Proc. 27th Eur. Conf. on Opt. Comm. (ECOC'01-Amsterdam), pp. 592-593.

(Continued)

*Primary Examiner*—David N. Spector
(74) *Attorney, Agent, or Firm*—Blakely, Sokoloff, Taylor & Zafman LLP

(57) ABSTRACT

An apparatus and method for modulating an optical beam by modulating a photonic band gap of a photonic crystal lattice. In one embodiment, an apparatus according to embodiments of the present invention includes a photonic crystal lattice in first semiconductor material. The first semiconductor material has a plurality of holes defined in the first semiconductor material. The plurality of holes are periodically arranged in the first semiconductor material with a hole pitch and a hole radius that define the photonic crystal lattice. The apparatus also includes second semiconductor material regions disposed proximate to and insulated from respective inside surfaces of the plurality of holes defined in the first semiconductor material and charge modulated regions, which are to be modulated in the second semiconductor material regions. An optical beam is to be directed through the photonic crystal lattice and is to be modulated in response to a modulated effective photonic band gap of the photonic crystal lattice. The effective photonic band gap modulated in response to the charge modulated regions.

27 Claims, 8 Drawing Sheets

FOREIGN PATENT DOCUMENTS

WO PCT/US2005/002988 5/2005

OTHER PUBLICATIONS

Leonard, S.W., et al., "Tunable Two-Dimensional Photonic Crystals Using Liquid-Crystal Infiltration," The American Physical Society, Third Series, vol. 61, No. 4, (Jan. 15, 2000), pp. 2389-2392.

Schuller, CH., et al., "Tunable Photonic Crystals Fabricated in III-V Semiconductor Slab Waveguides Using Infiltrated Liquid Crystals," Applied Physics Letters, vol. 82, No. 17, (Apr. 28, 2003), pp. 2767-2769.

Mertens, G., et al., "Tow- and Three-Dimensional Photonic Crystals Made of Macroporous Silicon and Liquid Crystals," Applied Physics Letters, vol. 83, No. 15, (Oct. 13, 2003), pp. 3036-3038.

Leonard, S.W., et al., "Attenuation of Optical Transmission Within the Band Gap of Thin Two-Dimensional Macroporous Silicon Photonic Crystals," Applied Physics Letters, vol. 75, No. 20, (Nov. 15, 1999), pp. 3063-3065.

Shimoda, Y., et al., "Electric Field Tuning of a Stop Band in a Reflection Spectrum of Synthetic Opal Infiltrated with Nematic Liquid Crystal," Applied Physics Letters, vol. 79, No. 22, (Nov. 26, 2001), pp. 3627-3629.

Kee, C.S., et al., "Tunable Complete Photonic Bands Gaps of Two-Dimensional Photonic Crystals with Intrinsic Semiconductor Rods," The American Physical Society, Physical Review B, vol. 64, (Sep. 10, 2001), pp. 121103-1-121103-4.

Hu, X., et al., "Ultrafast Three-Dimensional Tunable Photonic Crystal," Applied Physics Letters, vol. 83, No. 13, (Sep. 29, 2003), pp. 2518-2520.

Leonard, S.W., et al., "Ultrafast Band-Edge Tuning of a Two-Dimensional Silicon Photonic Crystal Via Free-Carrier Injection," The American Physical Society, Physical Review B 66, (Oct. 9, 2002), pp. 161102-1-161102-4.

Ha, Y.K., et al., "Tunable Three-Dimensional Photonic Crystals Using Semiconductors With Varying Free-Carrier Densities," The American Physical Society, Physical Reveiw B 66, (Aug. 9, 2002) pp. 075109-1-075109-5.

Halevi, P., et al., "Tunable Photonic Crystals with Semiconducting Constituents," The American Physical Society, Physical Review Letters, vol. 85, No. 9, (Aug. 28, 2000), pp. 1875-1878.

Johnson, S.G., "Introduction to Photonic Crystals: Bloch's Theorem, Band Diagrams, and Gaps (But No Defects)," (Feb. 3, 2003), pp. 1-16.

"Photonic Crystals," http://physicsweb.org/article/world/13/8/9, (Jan. 9, 2004), pp. 1-9.

\* cited by examiner

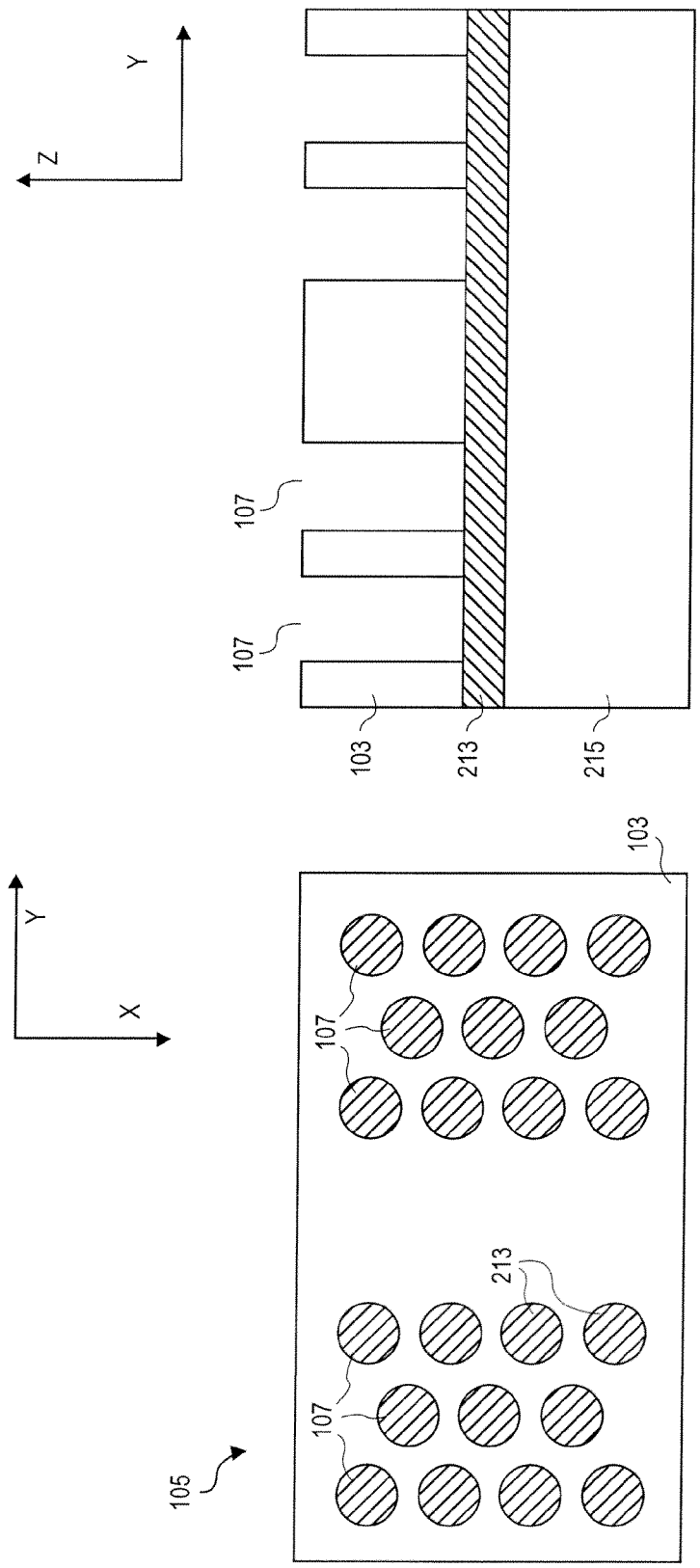

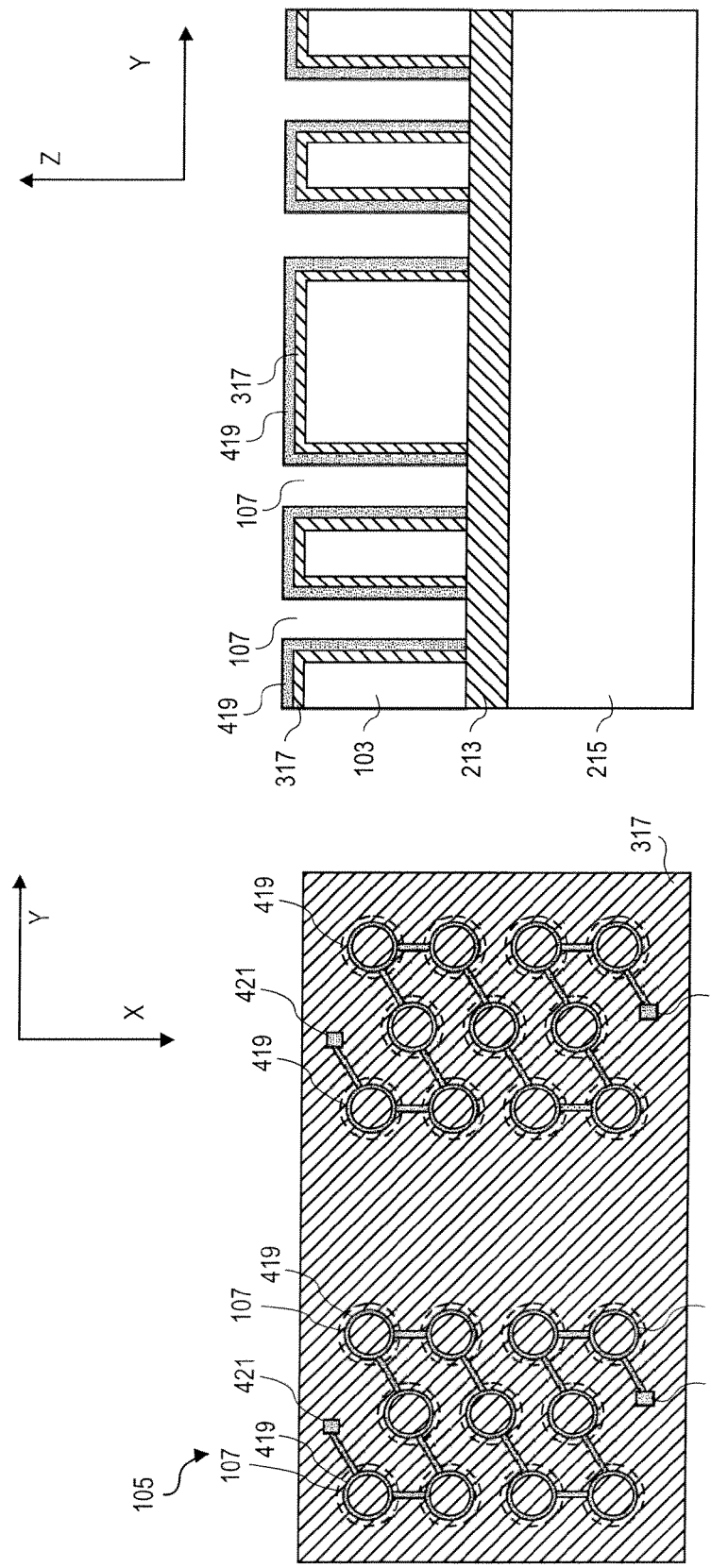

METHOD AND APPARATUS FOR MODULATING AN OPTICAL BEAM IN AN OPTICAL DEVICE WITH A PHOTONIC CRYSTAL LATTICE

BACKGROUND OF THE INVENTION

1. Field of the Invention

The present invention relates generally to optics and, more specifically, the present invention relates to modulating optical beams.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent material from ultraviolet to mid-infrared frequency range that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

FIG. 2A is a plan view diagram illustrating generally holes etched into an epitaxial layer a silicon-on-insulator (SOI) wafer according to one embodiment of an optical device in accordance with the teachings of the present invention.

FIG. 2B is a cross section diagram illustrating generally holes etched into the epitaxial layer of the SOI wafer according to one embodiment of an optical device in accordance with the teachings of the present invention.

FIG. 4A is a plan view diagram illustrating generally second semiconductor regions formed over the insulating regions that were formed over the holes that were etched into the epitaxial layer of the SOI wafer according to one embodiment of an optical device in accordance with the teachings of the present invention.

FIG. 4B is a cross section diagram illustrating generally second semiconductor regions formed over the insulating regions that were formed over the holes that were etched into the epitaxial layer of the SOI wafer according to one embodiment of an optical device in accordance with the teachings of the present invention.

DETAILED DESCRIPTION

Methods and apparatuses for modulating an optical beam with an optical device having a photonic crystal lattice are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

In one embodiment of the present invention, a semiconductor-based optical device is provided in a fully integrated solution on a single integrated circuit chip. One embodiment of the presently described optical device includes a semiconductor-based photonic crystal lattice patterned in semiconductor material through which an optical waveguide is directed. The optical device exploits the photonic band gap in the photonic crystals of the photonic crystal lattice. The photonic band gap of the photonic crystal lattice will block a wavelength of an optical beam while allowing other wavelengths of the optical beam to propagate.

As will be discussed, in order for a particular wavelength to experience the photonic band gap, a photonic crystal lattice according to embodiments of the present invention has a particular hole radius, a particular hole pitch and is made of a material having a particular index of refraction. In one embodiment, the effective hole radius of the holes of the photonic crystal lattice is modulated by modulating the index of refraction of the material defining or surrounding the holes of the photonic crystal lattice. In one embodiment, the index of refraction of the material defining the holes is modulated by modulating charge in charge modulated regions that are proximate to the holes of the photonic crystal lattice in accordance with the teachings of the present invention. Embodiments of the disclosed optical devices can be used in a variety of high bandwidth applications including multi-processor, telecommunications, networking as well as other high speed optical applications such as optical switches, modulators, or the like.

Figure 1:
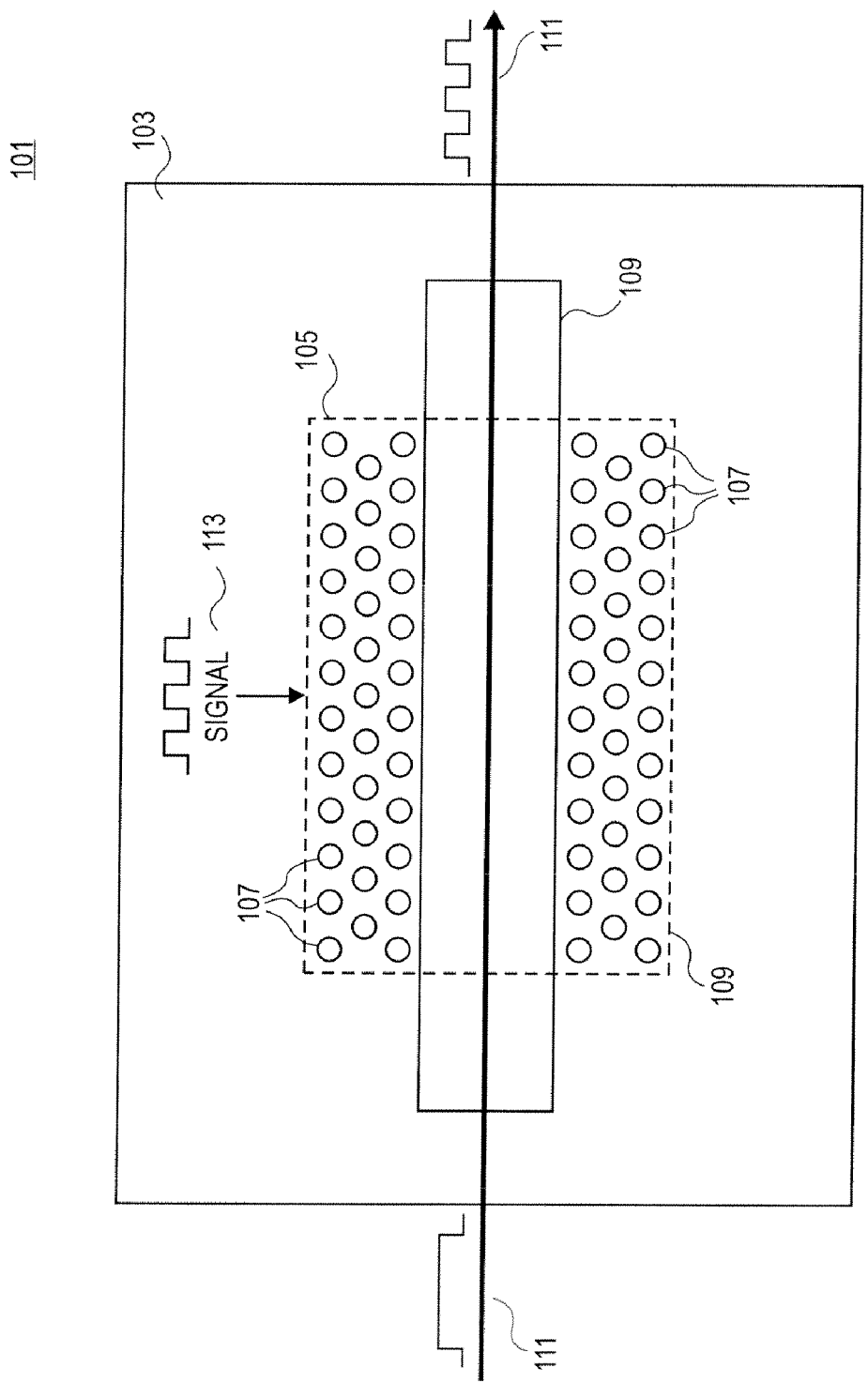
FIG. 1 is a diagram illustrating generally one embodiment of an optical device including a photonic crystal lattice in semiconductor having a waveguide through which an optical beam is directed and modulated in accordance with the teachings of the present invention.

To illustrate, FIG. 1 is a diagram illustrating generally one embodiment of an optical device including a photonic crystal lattice fabricated in semiconductor material and having photonic band gap that can be modulated in accordance with the teachings of the present invention. As shown in FIG. 1, optical device 101 includes semiconductor material 103 in which a photonic crystal lattice 105 is disposed. In one embodiment, an optical waveguide is included in semiconductor material 103 and is directed through photonic crystal lattice 105 as shown in FIG. 1. A plurality of holes 107 are periodically arranged in semiconductor material 103 having a hole pitch and a hole radius that define photonic crystal lattice 105 in semiconductor material 103. In one embodiment, the hole pitch is approximately 500 nanometers and the hole radius is approximately 200 nanometers. It is appreciated of course that other hole pitch and hole radius dimensions may be utilized in other embodiments in accordance with the teachings of the present invention. The resulting photonic band gap of photonic crystal lattice 105 is determined by the hole pitch and the hole radius of the photonic crystal lattice 105.

An optical beam 111 having at least one wavelength is directed through optical waveguide 109 through semiconductor material 103 and photonic lattice 105. The photonic band gap of photonic crystal lattice 105 gives rise to a range of frequencies or wavelengths of optical beam 111 that cannot propagate through photonic crystal lattice 105. As a result, if a particular wavelength of optical beam 111 corresponds to the photonic band gap of photonic crystal lattice 105, then that particular wavelength of optical beam 111 is blocked while other wavelengths, if any, included in optical beam 111 are allowed to propagate freely through photonic crystal lattice 105.

As will be discussed, in one embodiment, charge modulated regions proximate to the plurality of holes are included in optical device 101 in accordance with the teachings of the present invention. In operation, a signal 113 is applied to photonic crystal lattice 105. In one embodiment, signal 113 may be a voltage signal while in another embodiment, signal 103 may be a current signal in accordance with the teachings of the present invention. The concentration of free charge carriers in the charge modulated regions is modulated in response to signal 113. As a result of this charge modulation, the index of refraction of the semiconductor material proximate to the plurality of holes 107 is modulated. As a result of this modulated index of refraction of the semiconductor material proximate to the plurality of holes 107, the effective hole diameter of the plurality of holes is modulated. As a result of this modulated hole diameter of the plurality of holes 107, the effective photonic band gap of photonic crystal lattice 105 is modulated. Therefore, optical beam 111, which includes the particular wavelength corresponding to the photonic band gap of photonic crystal lattice 105, is modulated in accordance with the teachings of the present invention.

In one embodiment, semiconductor material 103 is the epitaxial layer of a silicon-on-insulator (SOI) wafer. To illustrate, FIG. 2A is a plan view diagram of semiconductor material 103 of the epitaxial layer of an SOI wafer illustrating generally the plurality of holes 107 of photonic crystal lattice 105 are etched in semiconductor material 103 in accordance with the teachings of the present invention. In addition, FIG. 2B is a cross section diagram illustrating generally the plurality of holes 107 etched into the semiconductor material 103 of the epitaxial layer of the SOI wafer in accordance with the teachings of the present invention. In one embodiment, semiconductor material 103 has a particular index of refraction and the plurality of holes 107 are arranged in semiconductor material 103 with a hole pitch and hole that define photonic crystal lattice 105 with a particular band gap. As shown in FIGS. 2A and 2B, the SOI wafer includes a buried insulating region disposed between the semiconductor material 103 of the epitaxial layer and a buried semiconductor layer 215. In one embodiment, the plurality of holes 107 are etched in semiconductor material 103 down to the buried insulating layer 213. It is noted that in another embodiment, the plurality of holes 107 may be etched only partially through semiconductor material 103 and not down to buried insulating layer 213.

Figure 3B:
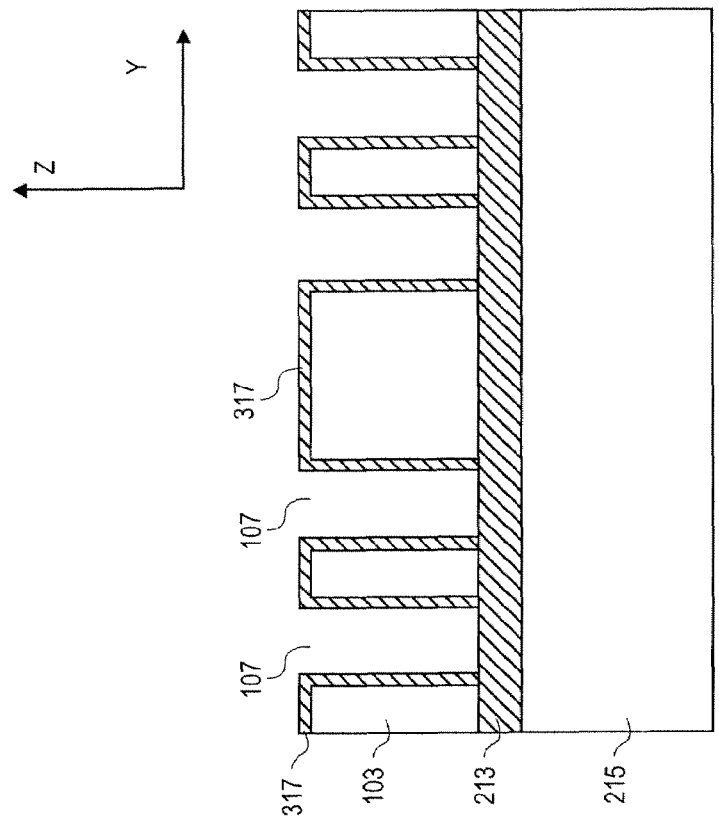
FIG. 3B is a cross section diagram illustrating generally the insulating region formed over the holes that were etched into the epitaxial layer of the SOI wafer according to one embodiment of an optical device in accordance with the teachings of the present invention.
Figure 3A:
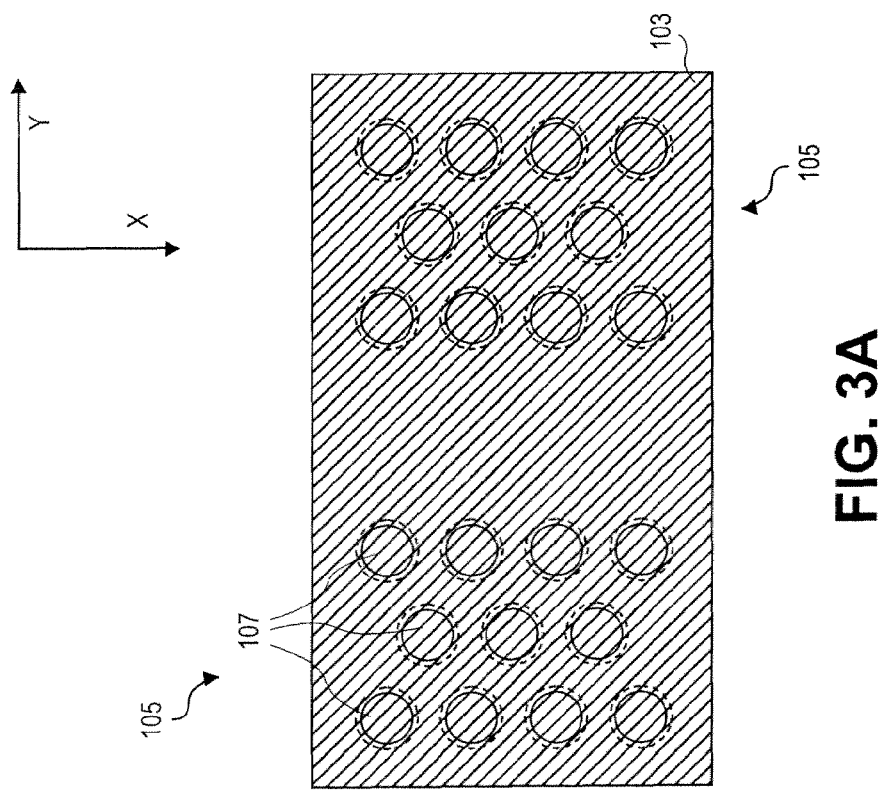
FIG. 3A is a plan view diagram illustrating generally an insulating region formed over the holes that were etched into the epitaxial layer of the SOI wafer according to one embodiment of an optical device in accordance with the teachings of the present invention.

After the plurality of holes 107 are etched into the semiconductor material 103 of the epitaxial layer of an SOI wafer as shown in FIGS. 2A and 2B, FIG. 3A shows a plan view diagram illustrating generally an insulating region 317 that is then formed over semiconductor material 103 including inside surfaces of the plurality of holes 107 of photonic crystal lattice 105 according to one embodiment of the present invention. FIG. 3B is a cross section diagram illustrating generally the insulating region 317 formed over the plurality of holes 107 according to one embodiment of the present invention. In one embodiment, insulating region 317 includes oxide and is formed with a thickness of approximately 120 Angstroms. It is appreciated of course that other insulating materials and other thicknesses may be utilized in other embodiments in accordance with the teachings of the present invention.

After the insulating region 317 is formed over semiconductor material 103 as shown in FIGS. 3A and 3B, FIG. 4A shows a plan view diagram illustrating generally second semiconductor material regions 419 formed over the insulating region 317 according to an embodiment of the present invention. FIG. 4B is a cross section diagram illustrating generally second semiconductor material regions 419 formed over the insulating region 317 according to an embodiment of the present invention. As shown in the embodiment depicted in FIGS. 4A and 4B, second semiconductor regions 419 are patterned over insulating region 317 including regions proximate to the inside surfaces of the plurality of holes 107 of photonic crystal lattice 105. The embodiment illustrated in FIG. 4A shows that second semiconductor material regions 419 are patterned such that each of the second semiconductor material regions 419 are coupled together. In one embodiment, contacts such as for example contacts 421 and 423 are included to provide electrical access to the second semiconductor material regions 419 that are proximate to the inside surfaces of the plurality of holes 107 of photonic crystal lattice 105. With insulating region 317, it is appreciated that second semiconductor material regions 419 are electrically insulated from semiconductor material 103 in accordance with the teachings of the present invention. It is appreciated therefore that a capacitive structures result from semiconductor material 103 being insulated from second semiconductor material regions 419 with insulating region 317 in accordance with the teachings of the present invention.

Figures 5A, 5B:
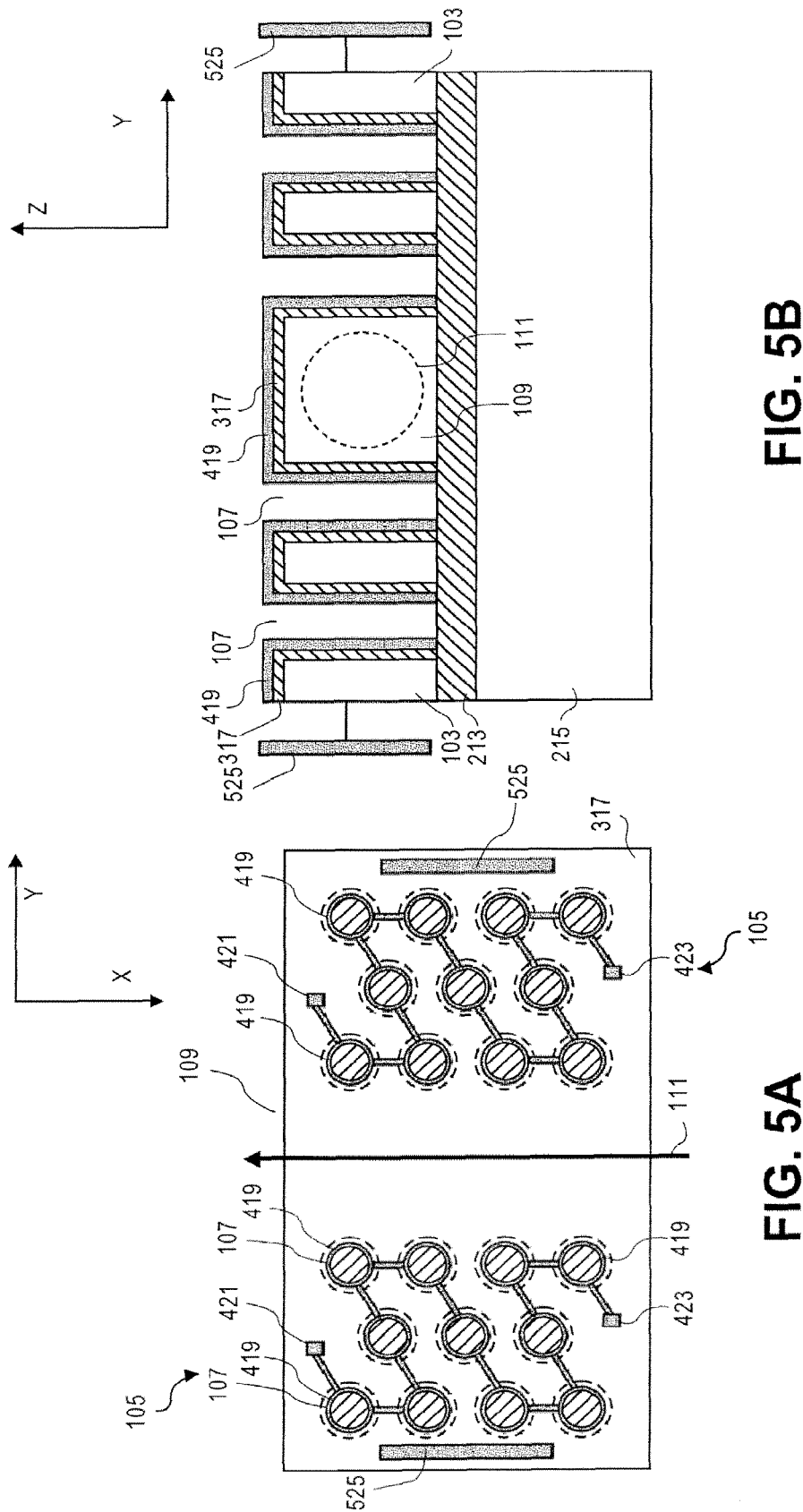
FIG. 5A is a plan view diagram illustrating generally contacts to the epitaxial layer of the SOI wafer and an optical beam directed through a resulting optical waveguide through the photonic crystal lattice in the epitaxial layer of the SOI wafer according to one embodiment of an optical device in accordance with the teachings of the present invention.
FIG. 5B is a cross section diagram illustrating generally contacts to the epitaxial layer of the SOI wafer and an optical beam directed through a resulting optical waveguide through the photonic crystal lattice in the epitaxial layer of the SOI wafer according to one embodiment of an optical device in accordance with the teachings of the present invention.

After the second semiconductor material regions 419 formed over the insulating region 317 as shown in FIGS. 4A and 4B, FIG. 5A shows a plan view diagram illustrating generally contacts 525 and 527 formed to provide electrical couplings to semiconductor material 103 according to an embodiment of the present invention. FIG. 5B is a cross section diagram illustrating generally contacts formed to provide electrical couplings to semiconductor material 103 according to an embodiment of the present invention. In an embodiment in which an electrical coupling is not necessary, it is appreciated that contacts 525 are optional. FIGS. 5A and 5B also illustrate generally optical waveguide 109 included in semiconductor material 103 and routed through photonic crystal lattice 105. Optical beam 111 is also shown in FIGS. 5A and 5B being directed through optical waveguide 109 through photonic crystal lattice 105 and semiconductor material 103 in accordance with the teachings of the present invention. In the illustrated embodiment, optical waveguide 109 is shown as a strip waveguide. It is appreciated that in other embodiments, optical waveguide 109 may be another type of waveguide such as for example a rib waveguide in accordance with the teachings of the present invention.

In one embodiment, each of the plurality of holes 107 is filled with a material having relatively high contrast to semiconductor material 103 and/or second semiconductor material regions 419. For example, in one embodiment, semiconductor material 103 includes crystal silicon and second semiconductor material regions 419 include polysilicon. In one embodiment, crystal silicon and polysilicon have indexes of refraction of approximately 3.45. In one embodiment, each of the plurality of holes 107 is filled with air, which has an index of refraction of approximately 1.0. These example materials are provided for explanation purposes and other suitable materials may be employed in accordance with the teachings of the present invention.

Figure 6C:
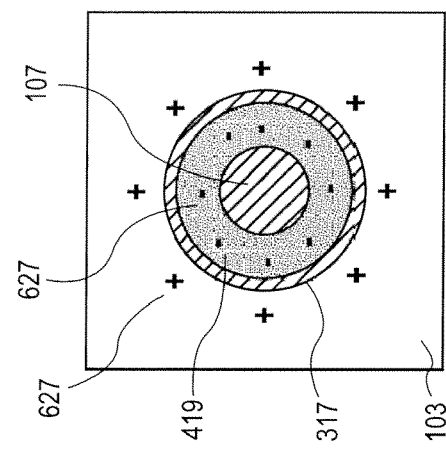
FIG. 6C is a diagram illustrating generally in greater detail charges in a charge modulated region in accordance with the teachings of the present invention.
Figure 6B:
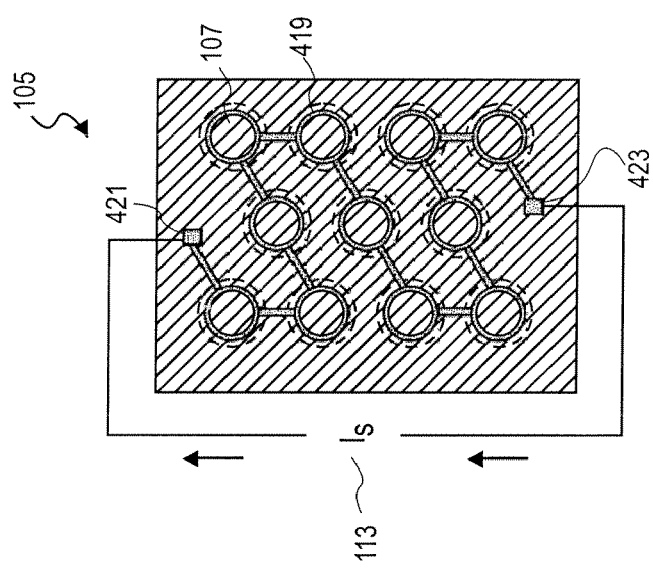
FIG. 6B is a diagram illustrating generally a current signal injected into a photonic crystal lattice according to one embodiment of the present invention to modulate charge in charge modulated regions in accordance with the teachings of the present invention.
Figure 6A:
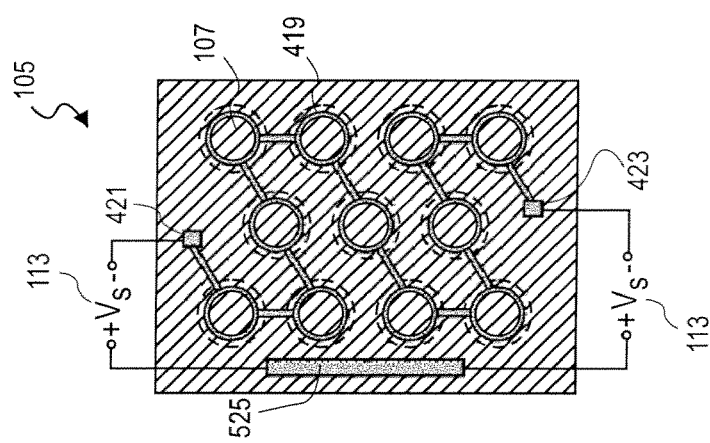
FIG. 6A is a diagram illustrating generally a voltage signal applied to a photonic crystal lattice according to one embodiment of the present invention to modulate charge in charge modulated regions in accordance with the teachings of the present invention.

FIG. 6A illustrates an example embodiment in which signal 113 is a voltage signal. In particular, signal 113 is shown in the depicted embodiment as a voltage signal $V_S$, which is applied between contacts 421 and 525 and contacts 423 and 525 in the illustrated embodiment. Accordingly, signal 113 is applied as a voltage through contacts 421 and 423 to second semiconductor regions 419 relative to semiconductor material 103.

FIG. 6B illustrates an example embodiment in which signal 113 is a current signal. In particular, signal 113 is shown in the depicted embodiment as a current signal $I_S$, which is injected through contacts 421 and 423 in the illustrated embodiment. Accordingly, signal 113 may be injected as a current through second semiconductor regions 419 between contacts 421 and 423 to inject charge into second semiconductor regions 419.

FIG. 6C is a diagram illustrating generally in greater detail one of the plurality of holes 107 defined in semiconductor material 103 with charge modulated regions 627 formed in response to signal 113 in accordance with the teachings of the present invention. It is appreciated that charge modulated regions 627 are therefore included in the capacitive structures that result from semiconductor material 103 being insulated from second semiconductor material regions 419 with insulating region 317. In particular, FIG. 6C shows second semiconductor material region 419 proximate to and insulated from the inside surface of hole 107 defined in semiconductor material 103. Insulating region 317 is disposed between semiconductor material 103 and second semiconductor material region 419 to insulate semiconductor material 103 from second semiconductor material region 419. With signal 113 applied, the charge concentration in charge modulated regions 627 is modulated. As shown in the embodiment depicted in FIG. 6C, charge modulated regions 627 includes free charge carriers in semiconductor material 103 and second semiconductor material region 419 proximate to the insulating region 317 proximate to the inside surface of hole 107. In one embodiment, the free charge carriers in charge modulated regions 627 may include for example electrons, holes or a combination thereof.

For explanation purposes, an embodiment in which signal 113 is "low," the concentration of free charge carriers in charge modulated regions 627 is relatively low. Continuing with the example, when signal 113 is "high," the concentration of free charge carriers in charge modulated regions 627 is relatively high. Thus, the signal 113 changes the free charge carrier density in charge modulated regions 627, which results in a change in the refractive index of the semiconductor material in which charge modulated regions 627 are located proximate to the plurality of holes 107. By changing the index of refraction, the effective hole radius is modulated in response to signal 113 in accordance with the teachings of the present invention. By changing the effective hole radius, the photonic band gap of photonic crystal lattice 105 is modulated accordingly, which changes the wavelength of optical beam 111 that is blocked by photonic crystal lattice 105 in accordance with the teachings of the present invention.

In one embodiment, the index of refraction of the semiconductor material in which charge modulated regions 627 is modulated due to the plasma optical effect. The plasma optical effect arises due to an interaction between the optical electric field vector and free charge carriers that may be present along the optical path of an optical beam, such as optical beam 111 in optical waveguide 109. The electric field of the optical beam 111 polarizes the free charge carriers and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. Therefore, the index of refraction in optical waveguide 109 proximate to the plurality of holes 107 in photonic crystal lattice 105 is modulated in response to the modulation of free charge carriers in charge modulated regions 627. The modulated index of refraction in the optical waveguide 109 through photonic crystal lattice 105 correspondingly modulates the phase of optical beam 111 propagating through photonic crystal lattice 105. In addition, the free charge carriers in charge modulated regions 627 are accelerated by the field and lead to absorption of the optical field as optical energy is used up. Generally the refractive index perturbation is a complex number with the real part being that part which causes the velocity change and the imaginary part being related to the free charge carrier absorption. In the case of the plasma optical effect in silicon, the refractive index change $\Delta n$ due to the electron ($\Delta N_e$) and hole ($\Delta N_h$) concentration change is given by:

$$\Delta n = -\frac{e^2 \lambda^2}{8\pi^2 c^2 \varepsilon_0 n_0} \left( \frac{b_e(\Delta N_e)^{1.05}}{m_e^*} + \frac{b_h(\Delta N_h)^{0.8}}{m_h^*} \right) \quad \text{(Equation 1)}$$

where $n_o$ is the nominal index of refraction for silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters.

Referring back to the example illustration of FIG. 6C, a 6 volt charge may be applied with signal 113 between semiconductor material 103 and second semiconductor material region 419 across insulating region 317, which in one embodiment is approximately 120 Angstroms thick. With the 6 volt applied voltage, the free charge carrier concentration is increased in charge modulated regions 627, which results in a change in the index of refraction of approximately 0.01 of the semiconductor material proximate to hole 107 in accordance with the teachings of the present invention. This refractive index change occurs over approximately 10 nanometers, which results in a 10 percent change in the effective hole diameter of hole 107. As a result, the photonic band gap of the photonic crystal lattice 105 is modulated in accordance with the teachings or the present invention.

Figure 7A:
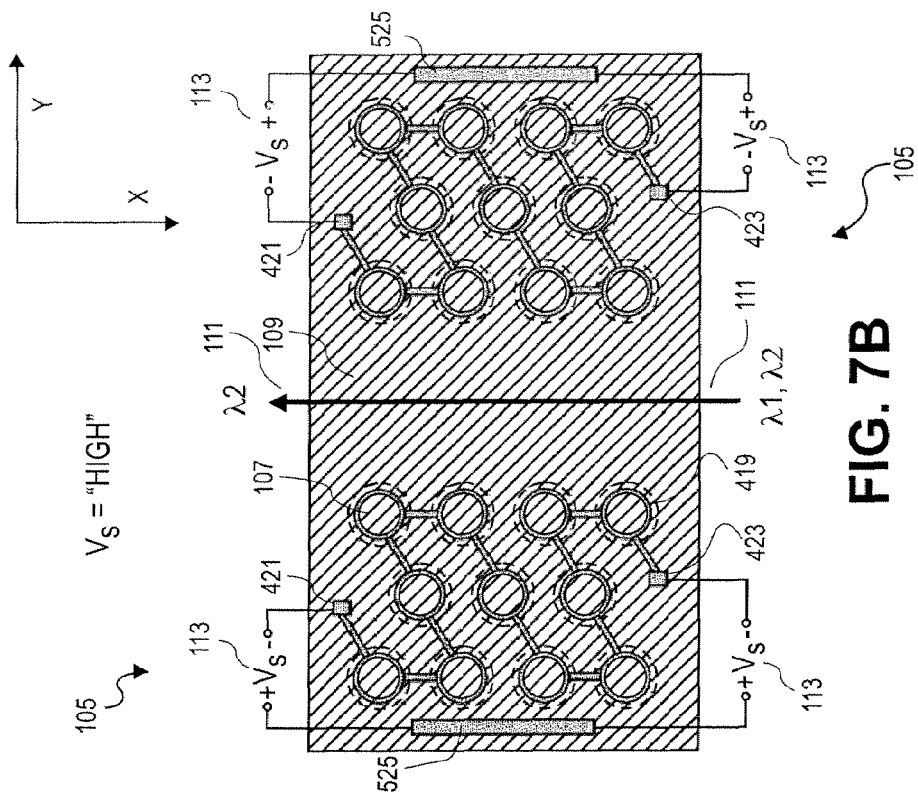
FIG. 7A is a diagram illustrating generally an optical beam having a plurality of wavelengths directed through an optical waveguide through a photonic crystal lattice with a "low" voltage signal applied in accordance with the teachings of the present invention.
Figure 7B:
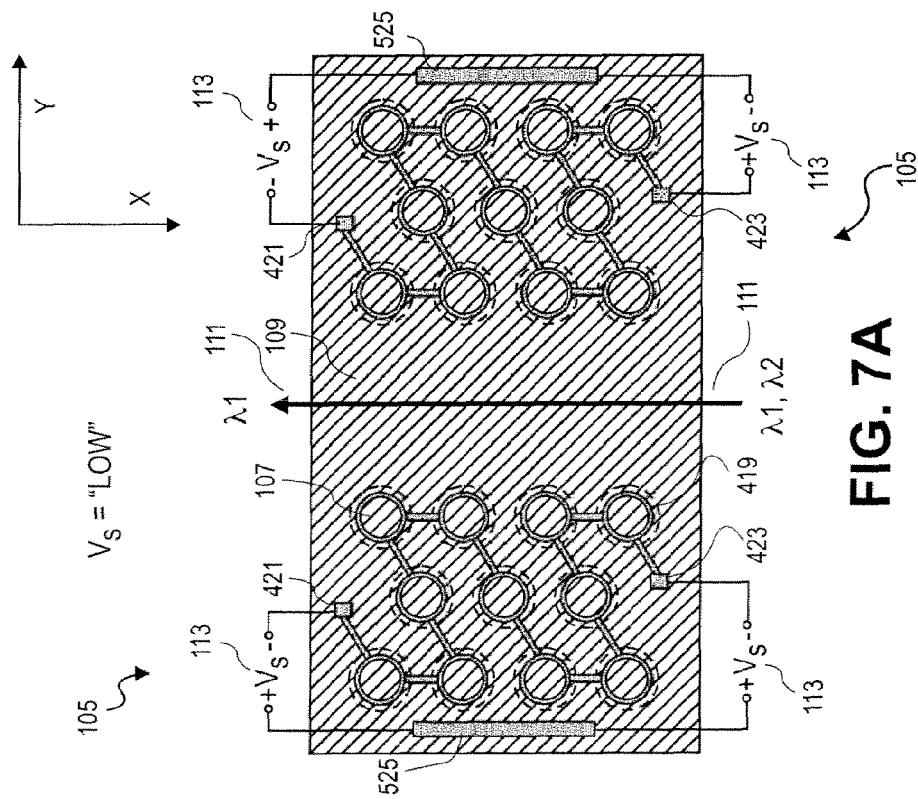
FIG. 7B is a diagram illustrating generally an optical beam having a plurality of wavelengths directed through an optical waveguide through a photonic crystal lattice with a "high" voltage signal applied in accordance with the teachings of the present invention.

With reference now to the embodiments shown in FIGS. 7A and 7B, optical beam 111 is illustrated being directed through optical waveguide 109 through semiconductor material 103 through photonic crystal lattice 105. In the illustrated embodiment, optical beam 111 includes two wavelengths $\lambda 1$ and $\lambda 2$ before being directed through photonic crystal lattice. In one embodiment, wavelengths $\lambda 1$ and $\lambda 2$ are infrared wavelengths near for example approximately 1310 nanometers or 1550 nanometers or the like. In FIG. 7A, signal 113 is illustrated to be a "low" voltage signal $V_S$. In the illustrated embodiment, with signal $V_S$ "low," photonic band gap of the photonic crystal lattice 105 blocks the wavelength $\lambda 2$ of optical beam 111, but allows the other wavelengths of the optical beam 111, such as $\lambda 1$, to propagate through photonic crystal lattice 105. In FIG. 7B, signal 113 is now illustrated to be a "high" voltage signal $V_S$. With signal $V_S$ "high," photonic band gap of the photonic crystal lattice 105 is now modulated to block the wavelength $\lambda 1$ of optical beam 111, but the other wavelengths of the optical beam 111, such as $\lambda 2$, are now allowed to propagate through photonic crystal lattice 105.

Figure 8:
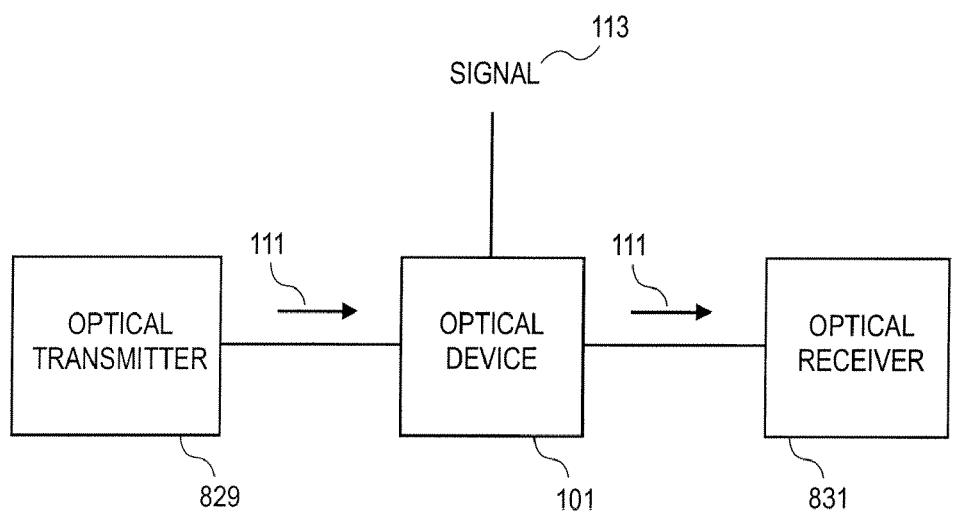
FIG. 8 is a diagram illustrating one embodiment of a system including an optical transmitter, an optical receiver and an optical device including a photonic crystal lattice to modulate an optical beam in accordance with the teachings of the present invention.

FIG. 8 is a diagram illustrating generally one embodiment of a system including an optical transmitter, an optical receiver and an optical device including a photonic crystal lattice to modulate or switch an optical beam in accordance with the teachings of the present invention. In particular, FIG. 8 shows optical system 833 including an optical transmitter 829 and an optical receiver 831 with an optical device 101 optically coupled between optical transmitter 829 and optical receiver 831. As shown in FIG. 8, optical transmitter 829 transmits an optical beam 111 that is received by optical device 101.

In one embodiment, optical device 101 includes a device such as one of the embodiments of the optical devices described previously to modulate or switch optical beam 111 or a specific wavelength of optical beam 111 in response to signal 113. For example, if optical beam 111 transmitted from optical transmitter 829 includes a wavelength $\lambda$, optical device 101 receives optical beam 111 and may be used to modulate the wavelength $\lambda$ of optical 111 to encode signal 113 onto optical beam 111 according to an embodiment of the present invention. Optical beam 111 is then directed from optical device 101 and received by optical receiver 831 with signal 113 encoded on optical beam 111.

In another embodiment, optical beam 111 transmitted from optical transmitter 829 may have a plurality of wavelengths including for example $\lambda 1$ and $\lambda 2$. Optical device 113 may be used to selectively block or filter out one of the wavelengths $\lambda 1$ or $\lambda 2$ while allowing the other wavelengths to propagate through in response to signal 113. Any remaining wavelengths included in optical beam 111 are then directed from optical device 101 to optical receiver 831. In other embodiments, it is appreciated that a plurality of optical devices 101 may be utilized as building blocks and be arranged or cascaded in various configurations to operate on a variety of wavelengths that may be included in optical beam 111 according to embodiments of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   a photonic crystal lattice in silicon semiconductor material, the silicon semiconductor material having a plurality of holes defined in the silicon semiconductor material, the plurality of holes periodically arranged in the silicon semiconductor material with a hole pitch and a hole radius to define the photonic crystal lattice;
   polysilicon semiconductor material regions disposed proximate to and insulated from respective inside surfaces of the plurality of holes defined in the silicon semiconductor material;
   charge modulated regions to be modulated in the polysilicon semiconductor material regions, wherein an optical beam directed through the photonic crystal lattice is modulated in response to a modulated effective photonic band gap of the photonic crystal lattice, the effective photonic band gap modulated in response to the charge modulated regions, wherein the effective photonic band gap of the photonic crystal lattice is modulated in response to a refractive index in the polysilicon semiconductor material that is modulated in response to the charge modulated regions.

2. The apparatus of claim 1 wherein the effective photonic band gap of the photonic crystal lattice is modulated in response to a refractive index in the polysilicon semiconductor material that is modulated in response to the charge modulated regions.

3. The apparatus of claim 1 wherein the effective photonic band gap of the photonic crystal lattice is modulated in response to an effective hole radius of each of the plurality of holes that is modulated in response to the charge modulated regions.

4. The apparatus of claim 1 wherein the optical beam has a plurality of wavelengths including a first wavelength and a second wavelength, wherein one of the first and second wavelengths of the optical beam is allowed selectively to propagate through the photonic crystal lattice at a time in response to the modulated effective photonic band gap of the photonic crystal lattice.

5. The apparatus of claim 1 wherein a voltage signal is coupled to be applied to the polysilicon semiconductor material regions relative to the silicon semiconductor material to induce the charge modulated regions to modulate the effective photonic band gap of the photonic crystal lattice.

6. The apparatus of claim 1 wherein a current signal is coupled to be injected through the polysilicon semiconductor material regions to induce the charge modulated regions to modulate the effective photonic band gap of the photonic crystal lattice.

7. The apparatus of claim 1 further comprising insulating material disposed between the polysilicon semiconductor material regions and the silicon semiconductor material to insulate each respective polysilicon semiconductor material region from the silicon semiconductor material.

8. The apparatus of claim 1 wherein the silicon semiconductor material includes crystal silicon.

9. The apparatus of claim 1 wherein each of the plurality of holes is filled with material having an index of refraction that is substantially different than an index of refraction of the silicon semiconductor material.

10. The apparatus of claim 1 wherein capacitive structures are defined by the polysilicon semiconductor material regions insulated from the silicon semiconductor material.

11. The apparatus of claim 1 further comprising an optical waveguide included in the silicon semiconductor material through the photonic crystal lattice, the optical beam to be directed through the optical waveguide and through the photonic crystal lattice.

12. A method, comprising:
    directing an optical beam through a photonic crystal lattice in silicon semiconductor material, the silicon semiconductor material having a plurality of holes defined in the silicon semiconductor material, the plurality of holes periodically arranged in the silicon semiconductor material with a hole pitch and a hole radius to define the photonic crystal lattice;
    modulating charge concentrations in charge modulated regions in polysilicon semiconductor material regions disposed proximate to and insulated from respective inside surfaces of the plurality of holes defined in the silicon semiconductor material;
    modulating an effective photonic band gap of the photonic crystal lattice in response to the modulated charge concentrations; and
    modulating the optical beam directed through the photonic crystal lattice in response to the modulated effective band gap.

13. The method of claim 12 further comprising modulating a refractive index in the polysilicon semiconductor material in response to modulating the charge concentrations in the charge modulated regions in the polysilicon semiconductor material regions.

14. The method of claim 12 further comprising modulating an effective hole radius of each of the plurality of holes in response to modulating the charge concentrations in the charge modulated regions in the polysilicon semiconductor material regions.

15. The method of claim 12 wherein modulating the optical beam directed through the photonic crystal lattice comprises selectively blocking one wavelength of the optical beam from propagating through the photonic crystal lattice in response to the modulated effective band gap of the photonic crystal lattice.

16. The method of claim 15 further comprising allowing another wavelength of the optical beam to propagate through the photonic crystal lattice while selectively blocking the one wavelength of the optical beam from propagating through the photonic crystal lattice in response to the modulated effective band gap of the photonic crystal lattice.

17. The method of claim 12 wherein modulating charge concentrations in the charge modulated regions the in polysilicon semiconductor material regions comprises modulating a voltage signal applied to the polysilicon semiconductor material regions relative to the silicon semiconductor material.

18. The method of claim 12 wherein modulating charge concentrations in the charge modulated regions in the polysilicon semiconductor material regions comprises modulating a current signal injected through the polysilicon semiconductor material regions.

19. A system, comprising:
an optical transmitter to transmit an optical beam;
an optical receiver; and
an optical device optically coupled between the optical transmitter and the optical receiver, the optical device including:
a photonic crystal lattice in silicon semiconductor material, the silicon semiconductor material having a plurality of holes defined in the silicon semiconductor material, the plurality of holes periodically arranged in the silicon semiconductor material with a hole pitch and a hole radius to define the photonic crystal lattice;
polysilicon semiconductor material regions disposed proximate to and insulated from respective inside surfaces of the plurality of holes defined in the silicon semiconductor material; and
charge modulated regions to be modulated in the polysilicon semiconductor material regions, the optical beam received from the optical transmitter and directed through the photonic crystal lattice, the optical beam modulated in response to a modulated effective photonic band gap of the photonic crystal lattice, the effective photonic band gap modulated in response to the charge modulated regions, wherein the modulated optical beam is received by the optical receiver.

20. The system of claim 19 wherein the effective photonic band gap of the photonic crystal lattice is modulated in response to a refractive index in the polysilicon semiconductor material that is modulated in response to the charge modulated regions.

21. The system of claim 19 wherein the effective photonic band gap of the photonic crystal lattice is modulated in response to an effective hole radius of each of the plurality of holes that is modulated in response to the charge modulated regions.

22. The system of claim 19 wherein the optical beam has a plurality of wavelengths including a first wavelength and a second wavelength, wherein one of the first and second wavelengths of the optical beam is allowed selectively to propagate through the photonic crystal lattice at a time in response to the modulated effective photonic band gap of the photonic crystal lattice.

23. The system of claim 19 wherein the optical device is coupled to receive a voltage signal to be applied to the polysilicon semiconductor material regions relative to the silicon semiconductor material to induce the charge modulated regions to modulate the effective photonic band gap of the photonic crystal lattice.

24. The system of claim 19 wherein the optical device is coupled to receive a current signal to be injected through the polysilicon semiconductor material regions to induce the charge modulated regions to modulate the effective photonic band gap of the photonic crystal lattice.

25. The system of claim 19 wherein the optical device further includes insulating material disposed between the polysilicon semiconductor material regions and the silicon semiconductor material to insulate each respective polysilicon semiconductor material region from the silicon semiconductor material.

26. The system of claim 19 wherein each of the plurality of holes is filled with material having an index of refraction that is substantially different than an index of refraction of the silicon semiconductor material.

27. The system of claim 19 wherein capacitive structures are defined by the polysilicon semiconductor material regions insulated from the silicon semiconductor material.

* * * * *